US009820151B2

(12) United States Patent
Gerstenberger et al.

(10) Patent No.: US 9,820,151 B2
(45) Date of Patent: *Nov. 14, 2017

(54) METHODS AND APPARATUSES FOR SUPPLYING A SUBSCRIPTION FOR COMMUNICATION OVER A MOBILE RADIO NETWORK

(71) Applicant: GIESECKE & DEVRIENT GMBH, Munich (DE)

(72) Inventors: Volker Gerstenberger, Erding (DE); Andreas Morawietz, München (DE); Nils Nitsch, Markt Schwaben (DE); Olaf Schneider, München (DE); Tom Weber, Buchloe (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/104,781

(22) PCT Filed: Dec. 19, 2014

(86) PCT No.: PCT/EP2014/003449
§ 371 (c)(1),
(2) Date: Jun. 15, 2016

(87) PCT Pub. No.: WO2015/090612
PCT Pub. Date: Jun. 25, 2015

(65) Prior Publication Data
US 2016/0323748 A1 Nov. 3, 2016

(30) Foreign Application Priority Data

Dec. 20, 2013 (DE) .......................... 10 2013 021 966

(51) Int. Cl.
*H04M 3/00* (2006.01)
*H04M 11/00* (2006.01)
(Continued)

(52) U.S. Cl.
CPC ........... *H04W 12/08* (2013.01); *H04W 4/025* (2013.01); *H04W 8/183* (2013.01); *H04W 12/04* (2013.01);
(Continued)

(58) Field of Classification Search
CPC ............................. H04W 12/08; H04W 12/06
(Continued)

(56) References Cited

U.S. PATENT DOCUMENTS 5,510,798 A * 4/1996 Bauer ..................... G01S 19/07
342/357.31
8,661,547 B1 * 2/2014 Kononov .............. G06F 21/577
713/176
(Continued)

FOREIGN PATENT DOCUMENTS

DE 102005027971 A1 12/2006
EP 2464153 A1 6/2012
(Continued)

OTHER PUBLICATIONS

English translation of EP2747085A1, Jan. 13, 2017.*
(Continued)

*Primary Examiner* — William D Cumming
(74) *Attorney, Agent, or Firm* — Workman Nydegger

(57) ABSTRACT

A method comprises the following steps: supplying the subscription on the security element of the user's mobile end device, with the subscription being held available on a background system by a service or product provider as one subscription of a plurality of subscriptions and enabling communication over a mobile radio network; and accessing the mobile radio network by the security element by means of the subscription supplied on the security element. While the security element accessing the mobile radio network the position of the mobile end device is determined at time intervals in order to check whether the position of the mobile end device falls within a predefined range of allowed positions and, if the established position of the mobile end device does not fall within the predefined range of allowed (Continued)

positions, the access of the security element to the mobile radio network is interrupted.

12 Claims, 3 Drawing Sheets

(51) Int. Cl.
| | |
|---|---|
| *H04W 24/00* | (2009.01) |
| *H04W 12/08* | (2009.01) |
| *H04W 12/04* | (2009.01) |
| *H04W 48/04* | (2009.01) |
| *H04W 8/18* | (2009.01) |
| *H04L 29/06* | (2006.01) |
| *H04W 4/02* | (2009.01) |

(52) U.S. Cl.
CPC .......... H04W 48/04 (2013.01); *H04L 63/107* (2013.01); *H04W 4/02* (2013.01)

(58) Field of Classification Search
USPC .................. 455/406, 418, 423; 379/265.09
See application file for complete search history.

(56) References Cited

U.S. PATENT DOCUMENTS

| | | | | |
|---|---|---|---|---|
| 2004/0186998 | A1* | 9/2004 | Kim | H04L 63/08 713/169 |
| 2005/0274793 | A1 | 12/2005 | Cantini et al. | |
| 2006/0141998 | A1* | 6/2006 | Kennedy | G01S 5/021 455/423 |
| 2008/0229382 | A1* | 9/2008 | Vitalos | H04L 63/0263 726/1 |
| 2009/0253408 | A1 | 10/2009 | Fitzgerald et al. | |
| 2010/0210304 | A1 | 8/2010 | Huslak | |
| 2012/0192258 | A1* | 7/2012 | Spencer | H04W 12/06 726/7 |
| 2012/0214441 | A1* | 8/2012 | Raleigh | G06Q 10/06375 455/406 |
| 2013/0281085 | A1 | 10/2013 | Sen et al. | |
| 2015/0050922 | A1* | 2/2015 | Ramalingam | H04W 12/08 455/418 |
| 2015/0117631 | A1* | 4/2015 | Tuchman | H04M 3/5233 379/265.09 |
| 2016/0315966 | A1* | 10/2016 | Jarnik | H04L 63/0853 |
| 2016/0323748 | A1* | 11/2016 | Gerstenberger | H04W 12/08 |

FOREIGN PATENT DOCUMENTS

| | | |
|---|---|---|
| WO | 0018156 A1 | 3/2000 |
| WO | 2013027085 A1 | 2/2013 |
| WO | 2013124635 A1 | 8/2013 |

OTHER PUBLICATIONS

German Search Report for corresponding German Application No. 102013021966.3, dated Sep. 1, 2014.
International Search Report for corresponding International PCT Application No. PCT/EP2014/003449, dated Mar. 17, 2015.

* cited by examiner

METHODS AND APPARATUSES FOR SUPPLYING A SUBSCRIPTION FOR COMMUNICATION OVER A MOBILE RADIO NETWORK

FIELD OF THE INVENTION

This invention concerns communication over mobile radio networks in general and, in particular, methods and apparatuses for supplying a subscription on a security element, such as a SIM, an eUICC/UICC, or the like. The security element here is part of a mobile end device which is configured for communicating over a mobile radio network.

BACKGROUND OF THE INVENTION

Communicating by means of a mobile end device, for example a smartphone or a mobile telephone, over a mobile radio network (also designated as a PLMN [Public Land Mobile Network]) which is operated by a network operator (also designated as an MNO [Mobile Network Operator]) as a rule requires that the mobile end device is equipped with a security element for securely storing data that uniquely identify the user of the mobile end device vis-à-vis the mobile radio network. For example, in a mobile end device that is configured for communicating according to the GSM standard (Global System for Mobile Communications), which is currently the most widespread mobile radio standard in the world, there is used a security element with the name SIM (Subscriber Identity Module) usually in the form of a chip card or smart card. According to the GSM standard, whose technical features are defined in a plurality of mutually linked and interdependent specifications, the SIM card contains subscriber identification data or subscription authorization data ("Subscription Credentials") which are part of a subscription (also called the subscription profile), for identifying and authenticating the user or subscriber, including an IMSI (International Mobile Subscriber Identity) and an authentication key $K_i$.

Such a subscription is as a rule firmly tied to a security element. However, scenarios are conceivable in which the possibility of a more flexible use of a subscription would be desirable.

Against this background, the present invention is faced with the object of proposing improved methods and apparatuses for supplying a subscription on a security element.

SUMMARY OF THE INVENTION

The hereinabove object is achieved according to the present invention by the respective subject matter of the independent claims. Preferred embodiments of the invention are defined in the dependent claims.

According to a first aspect of the invention, there is proposed a method for supplying a subscription on a security element which is part of a user's mobile end device, being insertable or permanently installed therein. The method comprises the following steps: supplying the subscription on the security element of the user's mobile end device, with the subscription being held available on a background system by a service or product provider as one subscription of a plurality of subscriptions and enabling communication over a mobile radio network; and accessing the mobile radio network by the security element by means of the subscription supplied on the security element. While the security element accesses the mobile radio network the position of the mobile end device is determined at time intervals in order to check whether the position of the mobile end device falls within a predefined range of allowed positions, wherein, if the established position of the mobile end device does not fall within the predefined range of allowed positions, the security element's access to the mobile radio network is interrupted.

Preferably, it can be provided that the subscription supplied on the security element is deactivated after a predefined time period.

According to preferred embodiments of the invention, the range of allowed positions for the subscription is predefined by the service or product provider holding the plurality of subscriptions available.

Preferably, the range of allowed positions is predefined in the same way for all subscriptions held available by the service or product provider.

According to preferred embodiments of the invention, the range of allowed positions is predefined by data which are deposited on the background system.

Preferably, the step of checking whether the position of the mobile end device falls within the predefined range of allowed positions is carried out by the mobile radio network or the background system.

According to preferred embodiments of the invention, the subscription is supplied to the security element of the mobile end device if the user of the mobile end device utilizes or will utilize a service or product provision of the service or product provider.

Preferably, the subscription is downloaded to the security element over a further mobile radio network over which the security element can communicate by means of a further subscription already present. Alternatively, the subscription is supplied on the security element over a WiFi network of the service or product provider or over another communication channel, such as NFC, Bluetooth, RFID, DECT, ZigBee, infrared, or the like.

According to preferred embodiments of the invention, the position of the mobile end device is determined by means of data from a global navigation satellite system, preferably GPS data. Alternatively or additionally, the position of the mobile end device can be determined by establishing the mobile radio cell in which the mobile end device is located.

The service or product provider may be a department store, a supermarket, a retail store, a restaurant, a coffee shop, the operator of a public mass transit system, a leisure park, a hotel, a sports organizer, a concert organizer, or the like.

According to a second aspect of the invention, there is supplied a security element that is part of a mobile end device, being insertable or permanently installed therein, and is configured for being furnished with a subscription by a method according to the first aspect of the invention in order to be able to communicate over the mobile radio network.

A security element according to the invention is for example a data carrier configured in hardware. The security element is for example arranged in a mobile end device as a permanently integrated part, whereby it either in this form cannot be removed from the end device, for example as a subscriber identification module, M2M module, coprocessor, Trusted Base, Trusted Platform Module. Alternatively, the security element is connected to the mobile end device as a removable module, for example as a chip card, in particular as a subscriber identification module, smart card, mass memory card, USB token, MultiMediaCard, secure MicroSD card, mobile radio network token, e.g. a UMTS Internet stick, and/or as an electronic identity document, for example as an electronic identity card or passport, with a person's machine-readable identification data deposited in a memory area.

According to a further alternative, the security element can be configured as a combination of hardware and software components in a trustworthy part of an operating system of the end device, which is also known to the skilled person as a secure runtime environment ("Trusted Execution Environment"; TEE). The security element can then be configured for example within such a secure runtime environment in the form of programs running therein, so-called Trustlets®.

As the skilled person will recognize, the hereinabove described preferred embodiments can be advantageously implemented both within the context of the first aspect of the invention, i.e. within the context of the method for supplying a subscription, and within the context of the second aspect of the invention, i.e. within the context of a security element having a subscription supplied according to the first aspect of the invention.

BRIEF DESCRIPTION OF THE DRAWINGS

Further features, advantages and objects of the invention will emerge from the following detailed description of several embodiment examples and embodiment alternatives. Reference is made to the drawings, in which there are shown.

DETAILED DESCRIPTION OF VARIOUS EMBODIMENTS

Figure 1:
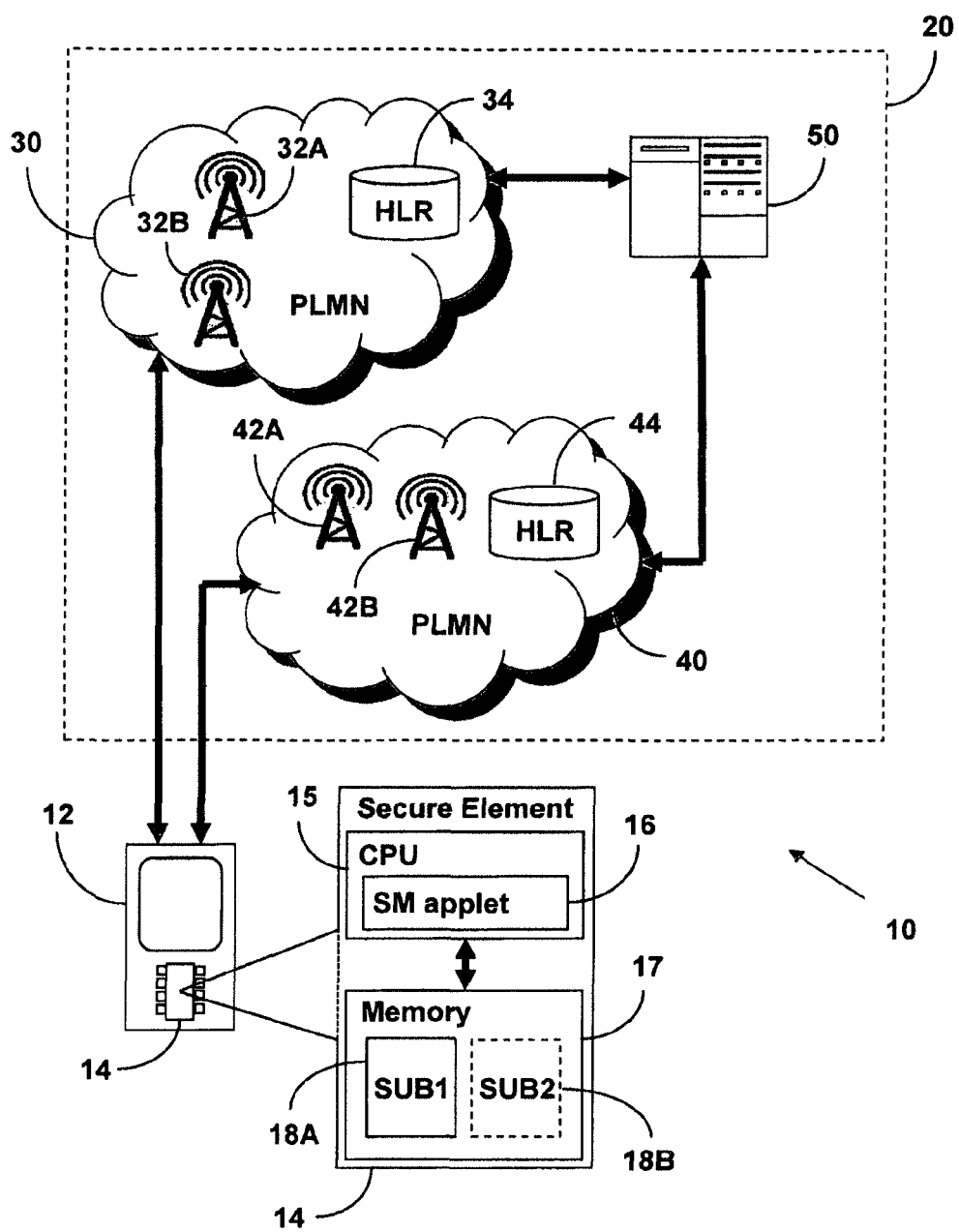
FIG. 1 a schematic representation of a communication system having a mobile end device having a security element and a mobile radio system, which illustrates different aspects of the present invention, FIG. 2 a schematic representation of a sequence that is preferred according to the invention for supplying a subscription on the security element of the mobile end device of FIG. 1, and FIG. 3 an exemplary schematic illustration of a range of positions of the mobile end device of FIG. 1 in which it is possible, according to preferred embodiments of the invention, to communicate over a mobile radio network by means of the subscription supplied according to FIG. 2, and of a range of positions in which it is not possible, according to preferred embodiments of the invention, to communicate over a mobile radio network by means of the subscription supplied according to FIG. 2.

FIG. 1 shows a schematic representation of the components of a communication system 10 and some of the communication connections between said components, which illustrates different aspects of the present invention.

An exemplary mobile end device 12 is represented in FIG. 1, comprising a security element ("Secure Element") 14 for securely storing and processing data that for example uniquely identify the mobile end device 12 and/or its user. As indicated in FIG. 1, the mobile end device 12 is preferably a mobile telephone, a smartphone or a similar apparatus. The skilled person will recognize, however, that the mobile end device 12 according to the present invention can likewise be configured in the form of other apparatuses that are adapted for communicating over a mobile radio network, such as a tablet computer, a notebook, a passenger car furnished for example with an M2M module, or the like.

According to preferred embodiments of the invention, the security element 14 is configured as an eUICC (embedded Universal Integrated Circuit Card) with a SIM application implemented thereon, i.e. as a security element that is a permanent part of the mobile end device 12 and is employed in a mobile radio network for uniquely and securely identifying the user or subscriber and for supplying different functions and value-added services. Alternatively, the security element 14 can be configured as a UICC (Universal Integrated Circuit Card) or SIM card (Subscriber Identity Module) which is known to the skilled person as one of the currently most frequently employed forms of security element. The skilled person will recognize, however, that other kinds of security elements which are designated as USIM, R-UIM, ISIM, and the like, depending on the generation and type of underlying mobile radio standard, are likewise embraced by the present invention.

According to further preferred embodiments of the invention, the security element 14 can be configured as a combination of hardware and software components in a trustworthy part of an operating system of a central processing unit of the mobile end device 12, which is also known to the skilled person as a secure runtime environment ("Trusted Execution Environment"; TEE). The security element 14 can then be configured for example within such a secure runtime environment of the mobile end device 12 in the form of programs running therein, so-called Trustlets®.

The mobile end device 12 is configured for communicating via the over-the-air interface with a mobile radio network (also designated as a "Public Land Mobile Network" [PLMN]) of a mobile radio system 20. In FIG. 1 the mobile radio networks 30 and 40 are represented by way of example. It is conceivable that the mobile radio network 30 is operated by a first mobile network operator (also designated as a "Mobile Network Operator" or MNO), and the second mobile radio network 40 by a second mobile network operator. According to preferred embodiments of the invention, the mobile radio network 30 and/or the mobile radio network 40 are operated according to the GSM standard ("Global Standard for Mobile Communications").

Hereinafter some preferred embodiments of the invention will be described in connection with mobile radio networks 30, 40 as part of the mobile radio system 20 according to the GSM standard, which is specified in a plurality of ETSI specifications. The skilled person will recognize, however, that the present invention can also be used advantageously in connection with other mobile radio networks. Such networks comprise mobile radio networks of the third generation (3GPP), such as UMTS (Universal Mobile Telecommunications System), mobile radio networks of the fourth generation (4G), such as LTE (Long Term Evolution), and other mobile radio networks, such as CDMA, and the like.

As is known to the skilled person, a mobile radio network or PLMN constructed according to the GSM standard generally comprises a BSS ("Base Station Subsystem") which consists of a plurality of BTSs ("Base Transceiver Stations") which define respective radio cells of the PLMN and are connected to a BSC ("Base Station Controller"). Usually, the BSC is one of a plurality of BSCs which communicate with a common MSC ("Mobile Switching Center"). Frequently, a local database, which is called the VLR ("Visitor Location Register"), is part of the MSC in order to hold information available about the mobile radio subscribers who are located at the moment in the radio cells that are served by an MSC (i.e. the range covered by an MSC). The MSC supplies substantially the same functionality as a switching center in a fixed-line network (public-switched telephone network;

PSTN) and is in communication with an HLR ("Home Location Register"), which is the PLMN's primary database storing information for logging in or authentication of the mobile radio subscribers. For this purpose, the HLR usually has access to an AUC ("Authentication Center"). As is known to the skilled person, the communication connections between the hereinabove described components of a PLMN can be based on proprietary and/or open standards. The employed protocols can be for example SS7- or IP-based. How the network components are configured as separate or combined units and how the interfaces between said components are configured is up to the MNO, so that the hereinabove description is merely to be understood as exemplary.

The skilled person will recognize that, although the hereinabove described functional units of a conventional mobile radio network according to the GSM standard can have other names in other or future mobile radio standards, the basic principles are substantially the same and they are hence likewise embraced by the invention.

For clarity's sake, the schematic representation of FIG. 1 shows, of the hereinabove described components of a mobile radio network, merely the following: two exemplary BTSs 32A, 32B and an HLR 34 for the mobile radio network 30 as well as two exemplary BTSs 42A, 42B and an HLR 44 for the mobile radio network 40. As indicated by FIG. 1, the mobile radio network 30 and the mobile radio network 40 are in communication at least at times with a background system 50, preferably in the form of a suitably configured server, as to be described hereinafter in detail. The mobile radio network 30 and/or the mobile radio network 40 can respectively have, besides further functional units known to the skilled person, for example an SMS-C ("Short Message Service Center") for storing, relaying, converting and delivering SMS messages, by means of which for example data from the background system 50 can be transferred to the security element 14 of the mobile end device 12.

As indicated by the enlarged view of the security element 14 in FIG. 1, the security element 14 preferably comprises a central processing unit or a central processor (CPU) 15. Preferably, the processor 15 is equipped such that applications can be executed on the processor 15, such as a subscription management application ("SM applet") which preferably supplies at least some of the features for managing subscriptions on the security element 14, as to be described in detail hereinafter in connection with FIG. 2. Preferably, the subscription management application 16 is implemented in the form of a Java applet. For supplying a corresponding runtime environment for the SM applet 16, a secure operating system (not shown in FIG. 1) can preferably be implemented on the processor 15.

The security element 14 preferably further comprises a memory unit 17 which is preferably implemented as a non-volatile, rewritable memory unit, e.g. in the form of a flash memory. As indicated by FIG. 1, a first subscription 18A (SUB1) is stored in the memory unit 17 of the security element 14. Preferably, the first subscription 18A contains data that enable the security element 14 and the mobile end device 12 to log into the mobile radio network 30 and communicate thereover, i.e. data, such as subscription authorization data ("Subscription Credentials"), an MNO-specific authentication algorithm, and the like. Preferably, at least parts of the memory unit 17 of the security element 14 are configured for securely storing the data therein, for example sensitive subscription authorization data, such as an IMSI ("International Mobile Subscriber Identity") or an authentication key $K_i$, which are part of the subscription 18A.

As indicated in FIG. 1, the memory unit 17 preferably has at least one further slot for accommodating additional subscriptions, for example for accommodating the further subscription 18B (SUB2) represented in FIG. 1, which is preferably supplied on the security element 14 from the background system 50 according to the method represented in FIG. 2 and described hereinafter in more detail.

Figure 2:
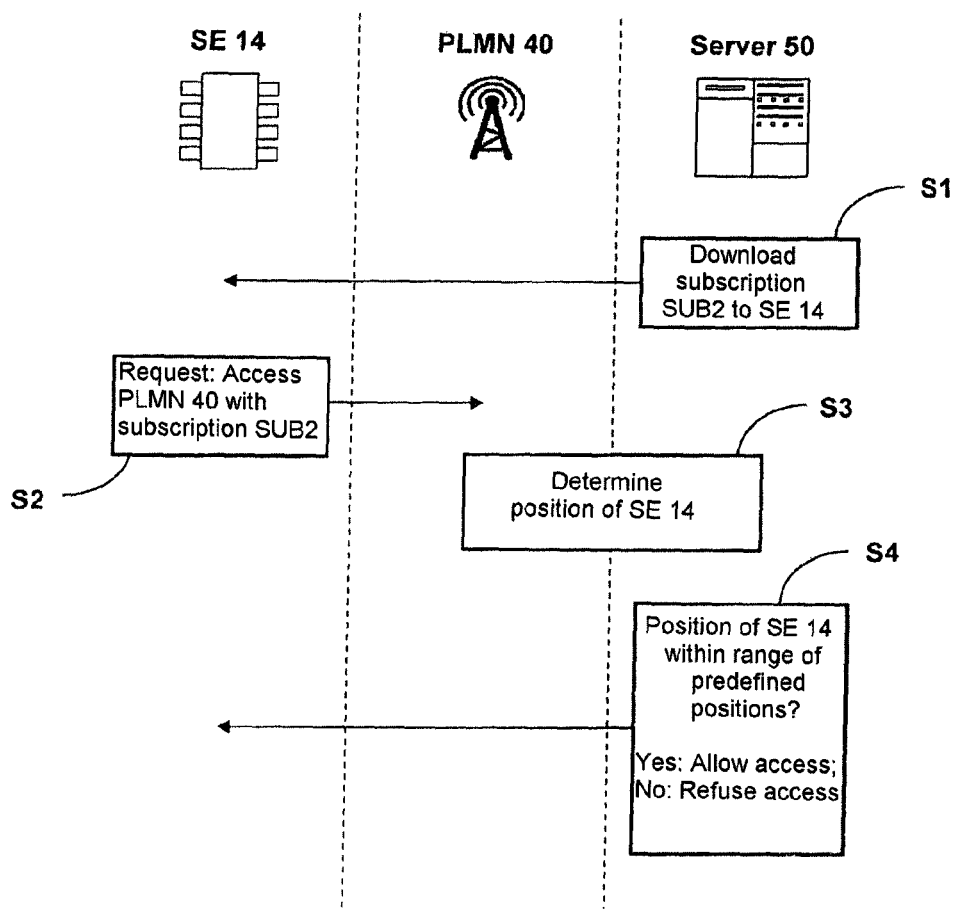

In step S1 of FIG. 2, a subscription 18B (SUB2) is supplied on the security element 14 by the subscription 18B being downloaded to the security element 14 from a server of the background system 50. By way of example, the subscription 18B supplied from the background system 50 allows communication over the mobile radio network 40.

The step S1 of FIG. 2 is preferably triggered by the user of the mobile end device 12 utilizing a service or product provision of a service or product provider. Such a service or product provider may be according to the invention for example a department store, a supermarket, a retail store, a restaurant, a coffee shop, the operator of a public mass transit system, a leisure park, a hotel, a sports organizer, a concert organizer, or the like. It is conceivable here that the method according to the invention is used when a user of a mobile end device 12 for example enters a department store, buys a beverage in a coffee shop or acquires a monthly pass from an operator of a public mass transit system, these being examples of the utilization of a service or product provision of a service or product provider as intended by the present invention.

As the skilled person will recognize, the step of downloading the subscription 18B to the security element 14 of the mobile end device 12 can be realized technically in many different ways. According to the invention it is conceivable, inter alia, that the subscription 18B is downloaded over the mobile radio network 30 over which the security element 14 can communicate on the basis of the subscription 18A already present. Alternatively, the subscription 18 could be downloaded to the security element 14 over a wireless LAN or WiFi network of the service or product provider.

After the subscription 18B has been downloaded to the security element 14 of the mobile end device 12 in step S1 of FIG. 2, the security element 14 can, in step S2 of FIG. 2, access the mobile radio network 40, i.e. in particular communicate thereover, by means of the subscription 18B downloaded in step 1.

According to the invention, it is now provided in a step S3 that preferably upon the first accessing of the mobile radio network 40 by the security element 14 of the mobile end device 12, and continuously thereafter, the current position of the mobile end device 12 is determined in order to be able to thereby check continuously whether the position of the mobile end device 12 falls within a predefined range of allowed positions. In the three hereinabove mentioned examples, said predefined range could correspond to the salesrooms of the department store, the customer region of the coffee shop or the route network of the operator of a public mass transit system. Preferably, corresponding data defining the range of allowed positions for the subscription 18B are deposited in a database of the background system 50, preferably in connection with the corresponding subscription.

The determination of the position of the mobile end device 12 can preferably be effected through the mobile radio network 40 and/or the background system 50.

According to a preferred embodiment of the invention, the mobile end device 12 is equipped with a GPS module or with a module for another global navigation satellite system, which is configured for delivering data by which the current position of the mobile end device 12 can be determined. Alternatively or additionally, the current position of the mobile end device 12 can be determined on the basis of the radio cell of the mobile radio network 40 in which the mobile end device 12 is located. As hereinabove described, a radio cell of the mobile radio network 40 is defined as a rule by a BTS, for example the exemplary BTSs 42A and 42B represented in FIG. 1.

After the current position of the mobile end device 12 or security element 14 has been determined in step S3 of FIG. 2, it is checked in a step S4 of FIG. 2 whether the current position of the mobile end device 12 or security element 14 that was determined in step S3 falls within the range of predefined allowed positions. As hereinabove described, a corresponding data set defining the range of allowed positions is preferably deposited in the background system 50 for the subscription 18B.

If it is ascertained upon this check in step S4 that the current position determined for the mobile end device 12 falls within the range of allowed positions, the access to the mobile radio network 40 by means of the subscription 18B is allowed. If, on the other hand, it is ascertained that the current position determined for the mobile end device 12 does not fall within the range of allowed positions, it is provided according to the invention that a communication by means of the subscription 18B over the mobile radio network 40 is not possible. In this way, the user of the mobile end device 12 can in particular be prevented from employing the subscription 18B supplied by the service or product provider outside the range of allowed positions defined by the service or product provider.

According to preferred embodiments of the invention, it can be additionally provided that the employment of the subscription supplied by the service or product provider is limited in time. It is for example that the service or product provider can stipulate that the subscription it supplies can be employed only for a time period of for example one hour, by corresponding stipulations being deposited in the mobile radio network 40 and/or background system 50.

Figure 3:
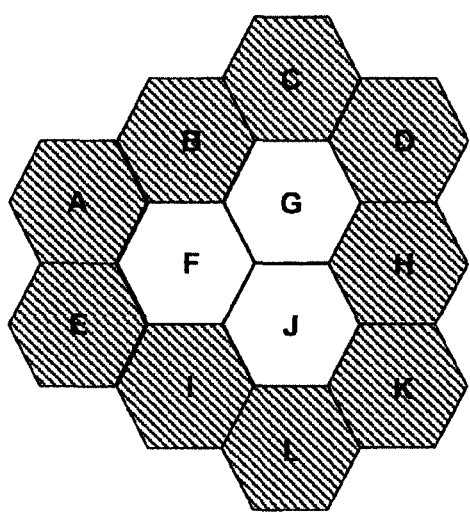

FIG. 3 shows an exemplary schematic representation of a range of positions of the mobile end device 12 that are allowed for employment of the subscription 18B as well as a range of positions thereof that are not allowed for employment of the subscription 18B, with the two ranges respectively being defined by corresponding mobile radio cells of the mobile radio network 40 which cover a certain spatial area. By way of example, a first range of said spatial area is defined by the mobile radio cells A to E, I, L and K (represented by hatching in FIG. 3), and a second range by the mobile radio cells F, G and J, with the second range representing by way of example the range of allowed positions as intended by the invention, which might be for example the salesrooms of a department store, the customer region of a coffee shop, the route network of a mass transit system, and the like. In this case, an attempt to employ the subscription 18A would only be successful if at the time of the corresponding request the mobile end device 12 or the security element 14 is located in the range of allowed positions defined by the mobile radio cells F, G and J. If, on the other hand, the mobile end device 12 or the security element 14 is currently located in the range of unallowed positions defined by the mobile radio cells A to E, I, L and K upon the attempt to employ the subscription 18B, the employment of the subscription 18B is refused according to the invention.

The method for supplying a subscription on a security element as described hereinabove in connection with FIGS. 2 and 3 can be advantageously used by a service or product provider in particular for creating a further incentive for utilizing a service or product provision offered by the service or product provider. The skilled person will recognize, however, that the method according to the invention is not restricted to the exact sequence of steps represented in FIG. 2. For example, the skilled person will recognize that a first position check of the mobile end device 12 can also be effected before the step S1 of FIG. 2, i.e. before the subscription 18B is downloaded to the security element 14.

The invention claimed is:

1. A method for supplying a subscription on a security element which is part of a user's mobile end device, being insertable or permanently installed therein, with the method comprising the following steps:
   supplying the subscription on the security element of the user's mobile end device, with the subscription being held available on a background system by a service or product provider as one subscription of a plurality of subscriptions and enabling communication over a mobile radio network; and
   accessing the mobile radio network by the security element by means of the subscription supplied on the security element, wherein the subscription is downloaded to the security element over a further mobile radio network over which the security element communicates using a second, different subscription already present on the security element;
   wherein while the security element accesses the mobile radio network the position of the mobile end device is determined at time intervals in order to check whether the position of the mobile end device falls within a predefined range of allowed positions; and
   upon determining that the established position of the mobile end device does not fall within the predefined range of allowed positions, the access of the security element to the mobile radio network is interrupted.

2. The method according to claim 1, wherein after a predefined time period the subscription supplied on the security element is deactivated.

3. The method according to claim 1, wherein the service or product provider holding the plurality of subscriptions available predefines the range of allowed positions for the subscription.

4. The method according to claim 1, wherein the range of allowed positions is predefined for the plurality of the subscriptions held available by the service or product provider.

5. The method according to claim 1, wherein the range of allowed positions is predefined by data which are deposited on the background system.

6. The method according to claim 1, wherein the step of checking whether the position of the mobile end device falls within the predefined range of allowed positions is carried out by the mobile radio network or the background system.

7. The method according to claim 1, wherein the subscription is supplied to the security element of the mobile end device if the user of the mobile end device utilizes a service or product provision of the service or product provider.

8. The method according to claim 1, wherein the subscription is supplied on the security element over a WiFi network of the service or product provider or over another communication channel.

9. The method according to claim 1, wherein the position of the mobile end device is established by means of data from a global navigation satellite system.

10. The method according to claim 1, wherein the position of the mobile end device is determined by establishing the mobile radio cell in which the mobile end device is located.

11. A security element which is part of a mobile end device, being insertable or permanently installed therein, the security element including a microprocessor and a memory configured to perform the following:
provide a subscription on the security element of the mobile end device, with the subscription being held available on a background system by a service or product provider as one subscription of a plurality of subscriptions and enabling communication over a mobile radio network,
access the mobile radio network by the security element by means of the subscription supplied on the security element, wherein the subscription is downloaded to the security element over a further mobile radio network over which the security element communicates using a second, different subscription already present on the security element,
while the security element accesses the mobile radio network, determine the position of the mobile end device at time intervals in order to check whether the position of the mobile end device falls within a predefined range of allowed positions; and
upon determining that the established position of the mobile end device does not fall within the predefined range of allowed positions, interrupt the access of the security element to the mobile radio network.

12. A communication system having a mobile radio network, a background system and a mobile end device,
wherein a subscription is provided on a security element of the mobile end device, with the subscription being held available on the background system by a service or product provider as one subscription of a plurality of subscriptions and enabling communication over the mobile radio network,
wherein the mobile radio network is accessed by the security element by means of the subscription supplied on the security element, wherein the subscription is downloaded to the security element over a further mobile radio network over which the security element communicates using a second, different subscription already present on the security element,
wherein while the security element accesses the mobile radio network the position of the mobile end device is determined at time intervals in order to check whether the position of the mobile end device falls within a predefined range of allowed positions; and
upon determining that the established position of the mobile end device does not fall within the predefined range of allowed positions, the access of the security element to the mobile radio network is interrupted.

* * * * *